(12) United States Patent
Wiklof et al.

(10) Patent No.: US 6,330,972 B1
(45) Date of Patent: Dec. 18, 2001

(54) ERROR CORRECTION ENHANCEMENT FOR CODE 93I AND OTHER MACHINE-READABLE SYMBOLOGIES

(75) Inventors: Christopher A. Wiklof, Everett; H. Sprague Ackley, Seattle, both of WA (US)

(73) Assignee: Intermec IP Corporation, Beverly Hills, CA (US)

( * ) Notice: Subject to any disclaimer, the term of this patent is extended or adjusted under 35 U.S.C. 154(b) by 0 days.

(21) Appl. No.: 09/177,679

(22) Filed: Oct. 22, 1998

(51) Int. Cl.[7] .............................. G06K 7/10; G06K 9/22; G06K 19/06
(52) U.S. Cl. ................................ 235/462.25; 235/462.07
(58) Field of Search ..................... 235/462.07, 462.12, 235/462.16, 462.19, 462.25

(56) References Cited

U.S. PATENT DOCUMENTS

| | | | |
|---|---|---|---|
| 3,906,202 | 9/1975 | Meyer ........................... | 235/61.11 E |
| 3,916,154 | 10/1975 | Hare et al. .................... | 235/61.11 E |
| 4,354,101 | 10/1982 | Hester et al. ................. | 235/463 |
| 4,855,581 | 8/1989 | Mertel et al. ................. | 235/462 |
| 5,184,005 | 2/1993 | Ukai et al. .................... | 235/472 |
| 5,479,515 | * 12/1995 | Longacre, Jr. ................. | 380/54 |
| 5,548,110 | * 8/1996 | Storch et al. ................. | 235/472 |
| 5,550,365 | 8/1996 | Klacnik et al. ............... | 235/462 |
| 5,553,084 | 9/1996 | Ackley et al. ................. | 371/37.1 |
| 5,723,853 | * 3/1998 | Longacre, Jr. et al. ....... | 235/472 |
| 5,761,219 | * 6/1998 | Maltsev ........................ | 371/37.01 |
| 6,012,638 | * 1/2000 | Ackley et al. ................. | 235/462.01 |

OTHER PUBLICATIONS

PDF417 Specification, Symbol technologies, Inc., 1991.*

* cited by examiner

Primary Examiner—Karl D. Frech
(74) Attorney, Agent, or Firm—Seed IP Law Group PLLC (57) ABSTRACT

A method and apparatus for error correction enhancement for decoding data collection symbols encoding data characters, special function characters, and error correction characters comprising: (i) reading a machine readable symbol; (ii) attempt to decode the symbol; (iii) selecting a group of n successive characters, where n is equal to the number of error correction characters in the symbol; (iv) attempt to solve an error correction equation while treating the group of characters as erasures; and (v) repeatedly selecting groups of successive characters and attempting to solve the error correction equation until the equation is solved or until there are no more groups of n successive characters. The method may further comprise: (vi) selecting a combination of n characters; (vii) attempting to solve the error correction equation while treating the combination of characters as erasures; and (viii) repeatedly selecting combinations of n characters and attempting to solve the error correction equation until the error correction equation solves, or until there are no more combinations of n characters, or until a timeout condition is reached.

28 Claims, 4 Drawing Sheets

ERROR CORRECTION ENHANCEMENT FOR CODE 93I AND OTHER MACHINE-READABLE SYMBOLOGIES

TECHNICAL FIELD

The present invention relates to a method and apparatus for decoding machine-readable symbols, and more particularly, to a method and apparatus for decoding symbols requiring error correction.

BACKGROUND OF THE INVENTION

Bar code symbologies are widely used for automated data collection. Bar code symbologies, such as U.P.C., Code 39, Interleaved 2 of 5, Code 93 and Code 93i, can be referred to as "linear symbologies" because data in a given symbol is decoded along one axis or direction. Symbologies such as linear symbologies encode "data characters" (i.e., human readable characters, and special function characters, such as start, stop or shift) as "symbol characters," which are generally parallel arrangements of alternating, multiple-width strips of lower reflectivity or "bars" separated by strips of higher reflectivity or "spaces." An "element" is a bar or space. Each unique pattern of bars and spaces within a predetermined width defines a particular symbol character, and thus a particular data character or characters. A given linear symbol encodes several data characters along its length as several groups of unique bar and space patterns.

As the data collection markets grew, symbologies required greater amounts of information to be encoded within a smaller area (i.e., greater "information density"). To increase the information density in linear symbologies, "multi-row" or "stacked" symbologies were developed, such as Co 49 and PDF41. Stacked symbologies generally employ several adjacent rows of multiple-width bars and spaces.

Linear and stacked symbologies are generally based on their "X dimension," which is the nominal width dimension of the narrow bars or spaces in the symbology. "Nominal" refers to the intended value for a specified parameter, regardless of printing errors, etc. For Code 93i, the X dimension represents the smallest width of a bar in a given symbol.

Assuming a reader encounters no difficulties, each symbol character analyzed in a symbol is converted into corresponding data to be used by the reader, the user, or other peripheral equipment. Unfortunately, data encoded under nearly all symbologies can result in errors when decoded by a reader. Errors are often caused by poor print quality in a symbol, poorly-designed reading equipment, and so forth. Some linear symbologies are designed to reduce such errors. For example, the ratio of widths between 1, 2, 3 and 4 wide "elements" (i.e., bars or spaces) in the Code 93i symbology is established so that known algorithms can distinguish between elements despite variations in the widths of the given elements.

To also reduce errors, certain symbologies include check characters. A check character is a character included within a symbol whose value is used to perform a mathematical check that determines whether the symbol has been decoded correctly. For example, each Code 93i symbol may have a pair of modulo 53 check characters that immediately precede the stop symbol character. The Code 93i check character "C" is calculated based on the modulo sum of the product of the symbol values, multiplied by a weighting sequence. The check character "K" is based on the modulo sum of the products of the symbol values and a different weighting sequence. A "symbol value" is a number representing a data character in a given symbology. For example, in the Code 93i symbology, the character "A" has a character value of "10."

Some symbologies improve upon the use of check characters by employing error correction characters. Error correction characters, as with check characters, are calculated mathematically from the other symbol characters in a symbol. Error correction characters are symbol characters in a symbol that are reserved for erasure correction, error correction, and/or error detection. An erasure is a missing, unscanned or undecodable symbol character; the symbol character's position is known, but not its value. An erasure can result from portions of a symbol having insufficient contrast, a symbol that falls outside a reader's field of view, or a portion of which is obliterated. An error is a misdecoded or mislocated symbol character; both the position and the value of the symbol character are unknown. An error can result from random spots or voids in a symbol when the symbol is printed.

For an error, the error correction characters allow a reader to use these characters in a symbol to locate and correct errors that have unknown values and locations. Two error correction characters are required to correct each error: one error correction character to locate the erroneous symbol character and the second error correction character to determine what value the erroneous symbol character should have been. For an erasure, the error correction characters allow a reader to use these characters to correct erroneous or missing symbol characters that have known locations. Consequently, only one error correction character is required to correct each erasure.

For error detection, the error correction characters allow a reader to use these characters in a symbol to detect the number of errors in the symbol that exceed the error correction capacity for the particular symbology. Error detection cannot correct the errors in the symbol, but can prevent a symbol from being decoded and producing erroneous data. Error correction characters can be reserved for error detection, and in most linear symbologies, such as Code 93i, these characters are referred to as check characters, as discussed above.

In the case of Code 93i, the error correction characters are algorithmically generated using standard Reed-Solomon error correction methods based on the data characters, the Special Features flag character, and the message length character, but excluding the start and stop characters and the five error correction characters. If a portion of the symbol contains errors or erasures (i.e., damage), the symbol may in some cases be decoded based on the error correction characters.

Many error correction algorithms perform computations roughly analogous with solving linear equations wherein with two equations and two unknowns, one can readily compute the two unknowns. As noted above, the error correction characters are computed using several equations with the symbol characters. Therefore, using the several equations that generated the error correction characters, and undamaged data and error correction characters, a reader may determine the values of the unknown symbol, and error correction characters having erasure damage by solving the equations (if the number of unknown characters does not exceed the number of equations). Consequently, if a few symbol characters are damaged, the remaining symbol characters and error correction characters can be used to correct the damaged symbol characters, or error correction characters may be corrected based on the remaining symbol characters. Overall, there is a tradeoff between damaged symbol and error correction characters and undamaged characters in a symbol that can be corrected under error correction algorithms.

The extent of any damage recoverable by the error correction characters depends upon the amount and type of damage suffered by the symbol. As a general rule, if the damage to the symbol is an erasure, e.g., a portion of the symbol is obscured or lost, standard readers can recover a number of symbol characters that is approximately equal to the number of remaining error correction characters in the symbol. An equation for the maximum erasure damage that can be corrected under known error correction algorithms can be represented as follows:

$$E > N_{ERASE}$$

where E is the total number of error correction characters remaining in the symbol and $N_{ERASE}$ is the total number of characters in the symbol lost due to erasure damage.

If the portion were not an erasure, but an error, the number of characters having errors must be equal to approximately half the number of the remaining error correction characters because the remaining error correction characters must determine both the location of the errors and the correct value for each error. An equation for the maximum error damage that can be corrected under known algorithms can be represented as:

$$2(E) > N_{ERROR}$$

where $N_{ERROR}$ is the total number of characters of the symbol suffering from error damage. Given the necessity for conciseness if machine readable symbols, and the need for accuracy, a more efficient method of error correction is desirable.

SUMMARY OF THE INVENTION

As represented in the claims below, the present invention, in a broad sense, embodies a method of error correction enhancement for a decoding routine, the decoding routine capable of decoding data collection symbols encoding data characters, special function characters, and error correction characters. The error correction characters are derived from the symbol and function characters. The method comprises: (i) reading a machine readable symbol; (ii) attempting to decode the symbol; (iii) selecting a group of n successive characters, where n is equal to the number of error correction characters in the symbol; (iv) attempting to solve an error correction equation while treating the group of characters as erasures; and (v) repeatedly selecting of n successive characters a attempting to solve the error correction equation until the equation is solved or until there are no more groups of n successive characters, or until a timeout condition occurs.

The method may further comprise: (vi) selecting a combination of n characters; (vii) attempting to solve the error correction equation while treating the combination of characters as erasures; and (viii) repeatedly selecting combinations of n characters and attempting to solve the error correction equation until the error correction equation solves, or until there are no more combinations of n characters, or until a timeout condition is reached.

Similarly, the present invention embodies an apparatus for decoding a machine-readable symbol representing encoded information, the symbol having symbol characters encoding data characters, function characters, and error correction characters that are derived from the symbol and function characters. The apparatus includes a sensor that receives light reflected from the symbol and produces an output signal therefrom. A receiver receives the output signal and produces a data signal indicative of at least some of the symbol characters, function characters, and error correction characters, but which fails to accurately indicate at least some of the symbol and repeating characters. A processor processes the data signal and produces a signal indicative of the information encoded in the symbol. The processor is programmed to: (i) attempt to decode the symbol; (ii) select a group of m successive characters, where n is equal to the number of error correction characters in the symbol; (iii) attempt to solve the error correction equation while treating the group of n successive characters as erasures; (iv) repeatedly select successive groups of n successive characters and attempt to solve the error correction equation until the error correction equation solves, or until there are no more groups of n successive characters, or until a timeout condition occurs.

The processor may further be programmed to: (v) select a combination of n characters; (vi) attempt to solve the error correction equation while treating the combination of characters as erasures; (vii) repeatedly select combinations of n characters and attempt to solve the error correction equation until the error correction equation solves, there are no more combinations of n characters, or a timeout condition occurs.

The method and apparatus thus employ an educated guess at the location of the error to improve error correction up to 100%, permitting n errors to be corrected with n error correction characters. Thus, none of the error correction characters are "wasted" in locating the position of the error. The method will even work with symbologies that employ padding characters for enhancing error correction, such as Code One. Other features and associated advantages of the present invention will become apparent from studying the following detailed description, together with the accompanying drawings.

DETAILED DESCRIPTION OF THE PRESENTLY PREFERRED EMBODIMENT

Figure 1:
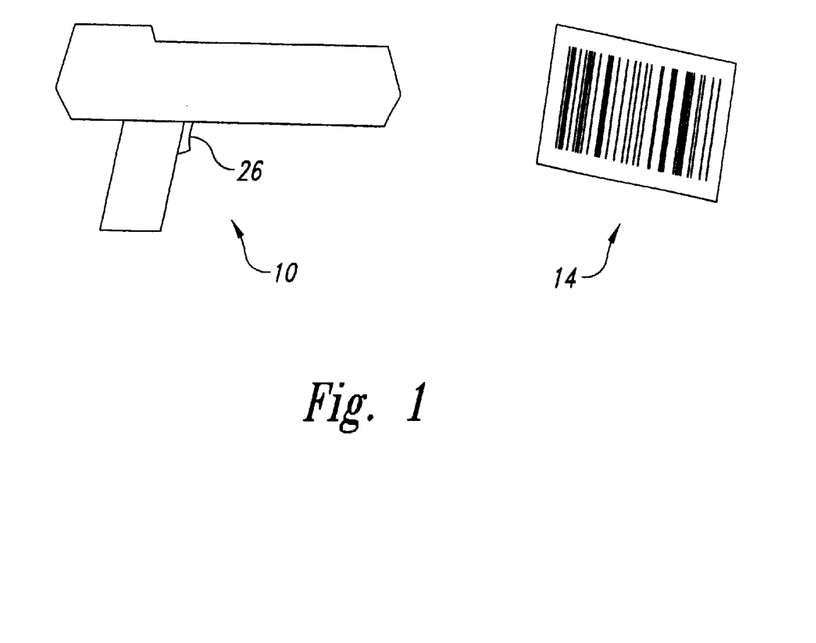
FIG. 1 shows a symbology reader reading a machine readable symbol.
Figure 2:
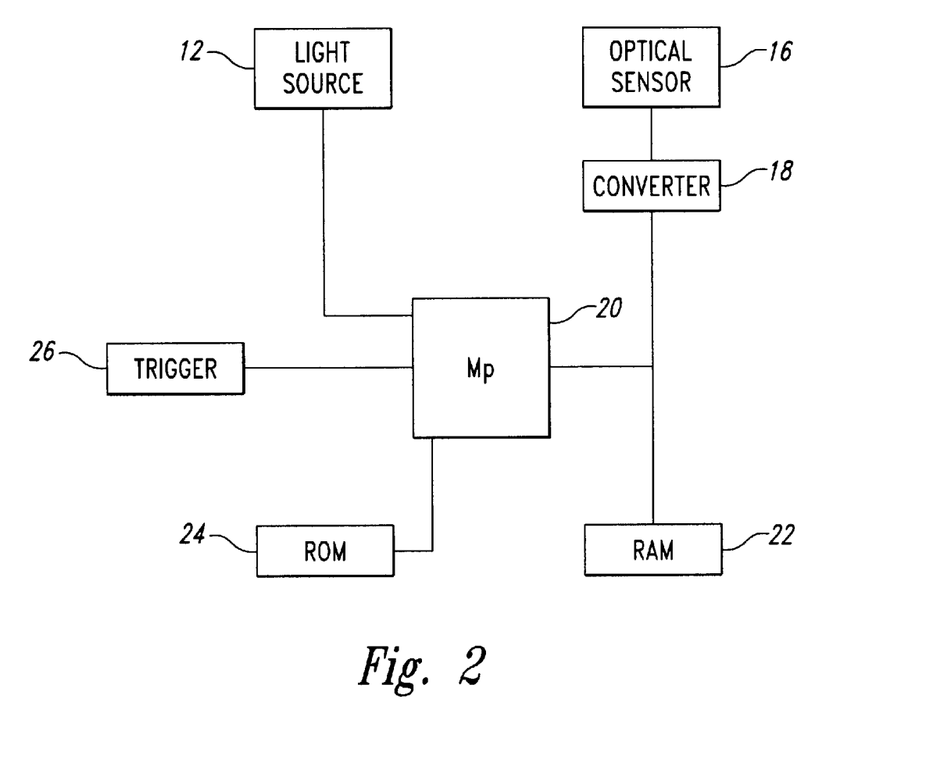
FIG. 2 shows a block diagram of the symbology reader of FIG. 1.

As shown in FIGS. 1 and 2, a data collection symbology reader 10 of the present invention includes a light source 12 that illuminates a data collection symbol, such as a Code 93i symbol 14. As used herein a "data collection symbol" refers to a symbol from any linear, stacked, 2D matrix or other machine-readable symbology. A sensor 16 in the reader 10 receives the light reflected from the symbol 14 and converts the received light into an electrical signal. The light source 12 is preferably a flash bulb, infrared light source, one or more LEDs or other light-emitting elements, while the sensor 16 is preferably a rasterizing laser scanner or a one dimensional CCD movable relative to the symbol. The sensor 16 may also be a charge-coupled device ("CCD"), one-dimensional semiconductor array, vidicon, a two-dimensional imager or other imager capable of converting received light into electrical signals.

A receiver or converter 18 receives the electrical signal from the sensor 54 and converts it into a signal to be processed by a programmed computer or processor 20. Typically, the sensor 16 produces an analog signal that represents the modulated light reflected from the elements in the symbol 14. If the processor 20 is a digital computer, then the converter 18 converts the analog signal into a digital signal to be processed by the processor 20. The converter 18 and/or processor 20 preferably store the digital signal in a memory, such as random access memory (RAM) 22. As described more fully below, the reader 10 performs a routine stored in the memory 22 that performs the enhanced error correction to thereby improve error correction performance of the reader 10. A second memory, such as a read only memory (ROM) 29, may statically store the program to prevent loss of the program when power is lost.

The sensor 16 preferably includes a one-dimensional array of photosensitive elements, such as a CCD. Each pixel element in the array outputs a grey level signal, i.e., an analog signal that determines the amount or intensity of light impinging upon the particular pixel element. Alternatively, each pixel element in the array of the sensor 16 can output a binary signal indicating that the particular pixel element is either black or white. After the signals from the sensor 16 are appropriately converted by the converter 18, the processor 20 stores the signals produced by the sensor 16 as an image within a field of view of the sensor 16. As a result, the processor 20 may repeatedly analyze and manipulate the stored signals.

The reader 10 can be a hand-held product and include a trigger switch 26 coupled to the processor 20. By actuating the trigger switch 26, the processor 20 causes the light source 12 to provide light to the symbol 14 that is reflected therefrom to the sensor 16. Since the processor 20 stores the signals that are output from the sensor 16 and converted by the converter 18, a user, by actuating the trigger switch 26, can cause the reader 10 to store an instantaneous image within the field of view of the reader, creating a "snapshot" of the symbol 10. The specific means and method for storing and locating an image of a symbol by the reader 10 are known and will be understood by those skilled in the relevant art without need for further description herein (e.g., U.S. Pat. No. 5,155,343).

Figure 3:
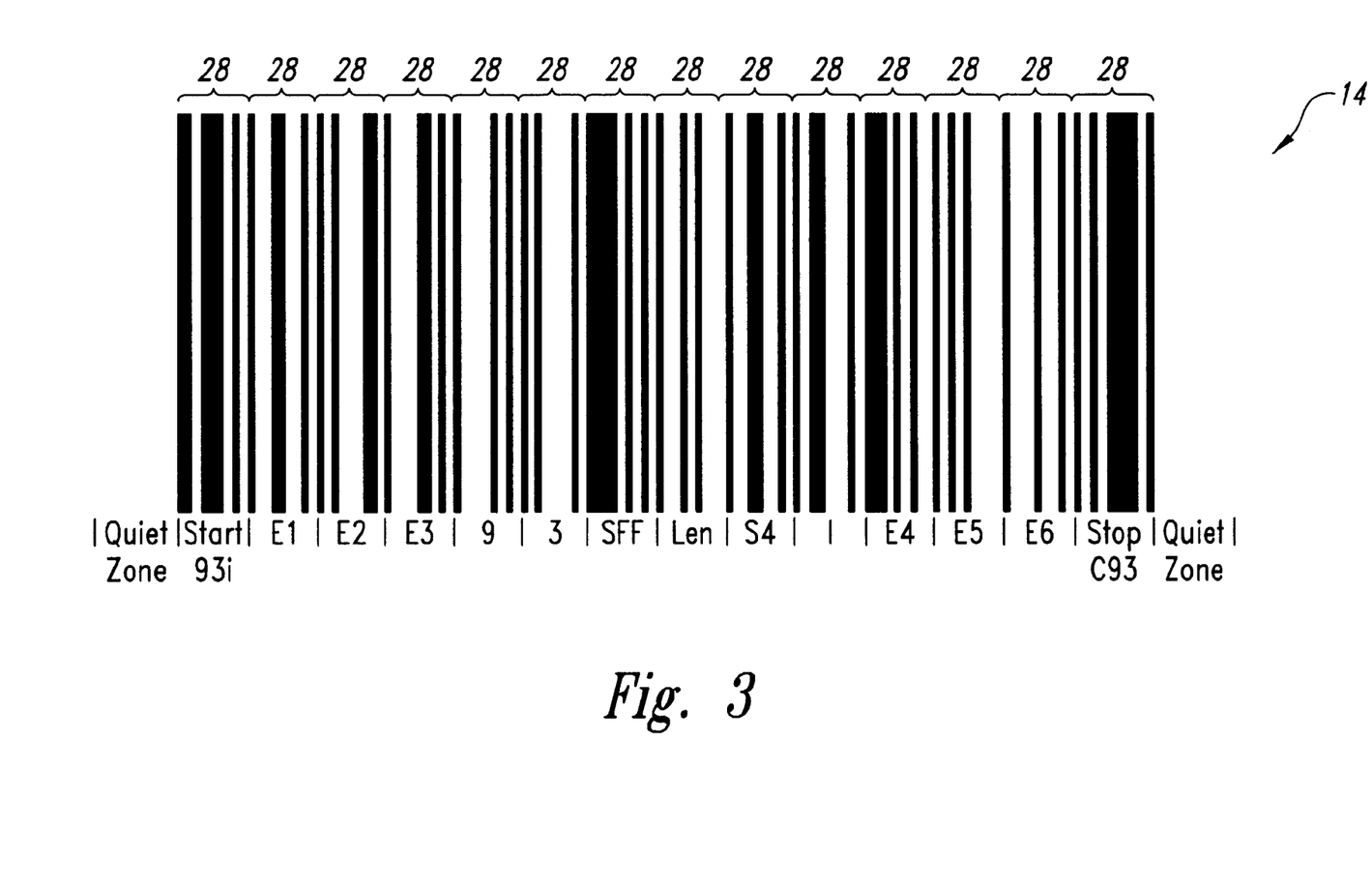
FIG. 3 shows a Code 93i symbol.

FIG. 3 shows the symbol characters in symbol 14 parsed into individual symbol characters 28, represented by short vertical lines between each symbol character 28, together with the corresponding data character for each symbol character 28. Each symbol character 28 is composed of a number of bars and spaces of varying widths. A quiet zone "Quite Zone" precedes a start symbol character "Start 93i" and a quite zone "Quite Zone" follows a stop character "Stop C93". The combination of start and stop characters "Start 93i", "Stop C93" may indicate that the symbol 14 contains error correction.

A number of error correction characters E1–E3 follow the start character Start 93i and a number of error correction characters E4–E6 precede the stop character Stop C93. Thus the symbol 14 contains a total of six error correction characters E1–E6 four of which are available for erasure correction. The symbol 14 further includes a Special Function Flag symbol character "SFF" and a length symbol character "Len" representing the total length of the symbol 14. The Special Function Flag "SFF" is located at the middle of the symbol 14 since the symbol 14 contains error correction characters E1–E6.

The symbol 14 encodes the data characters "93i" in the symbol characters corresponding to "9" "3" "S4" and "I" where "S4" shifts the immediately following symbol character to obtain the lowercase "i".

Figure 4A:
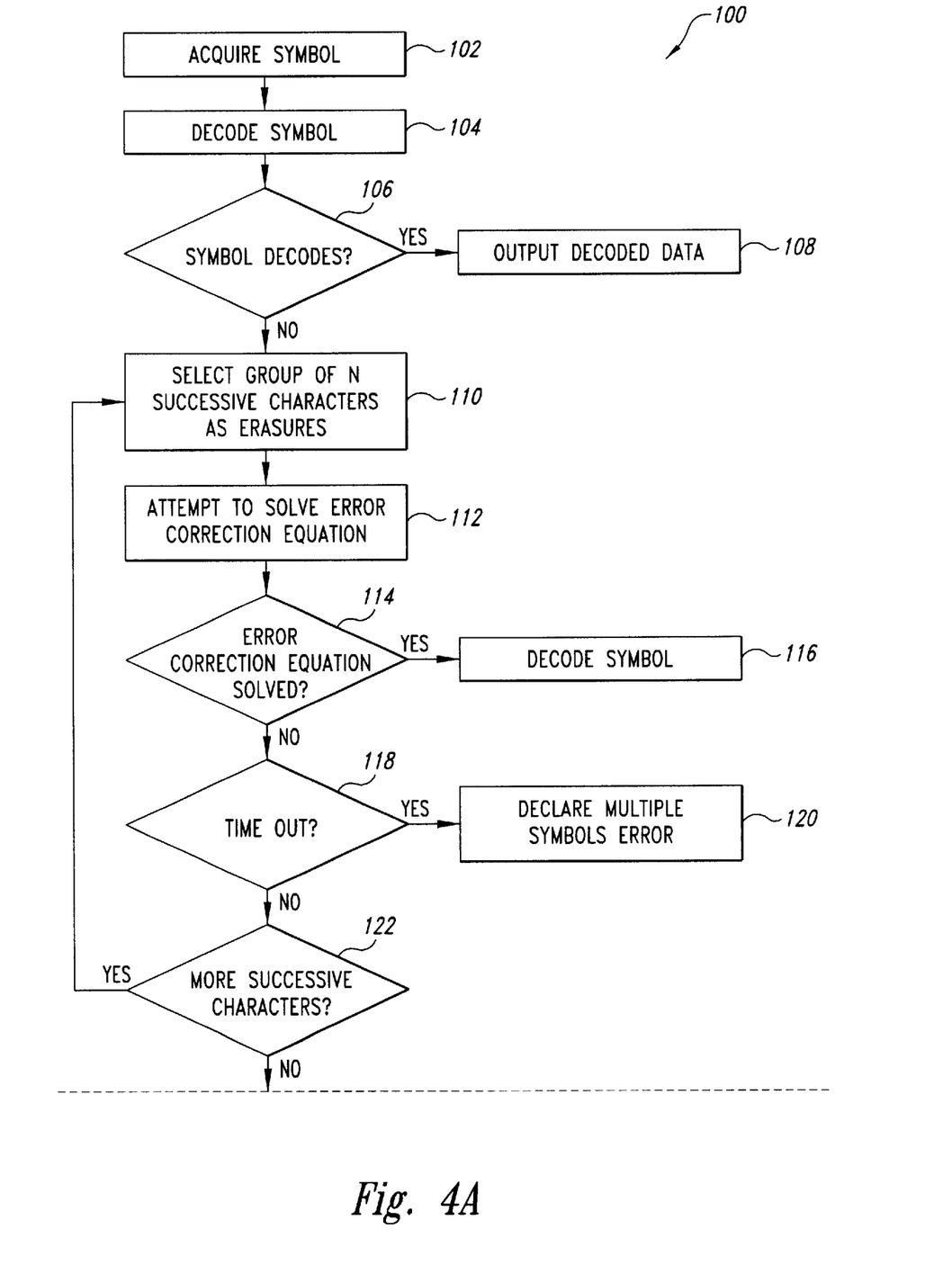
FIGS. 4A and 4B show an exemplary method of enhanced error correction.
Figure 4B:
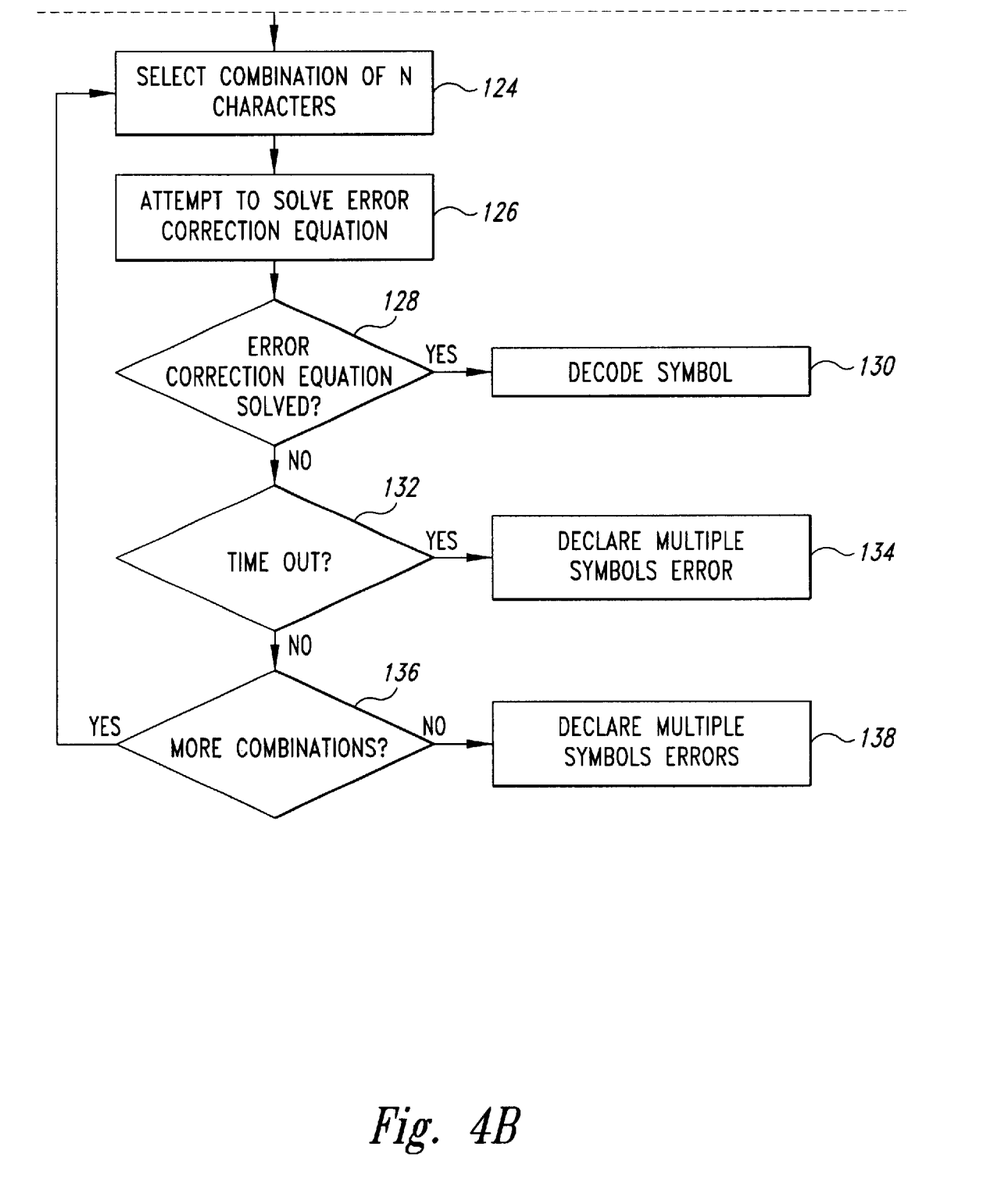

Referring to FIG. 4, an error correction enhancement routine 100, executed by the processor 20, begins in step 102 by acquiring an image or scan of a symbol such as the symbol 14 of FIG. 3 and attempting to decode the symbol 14 in step 104. In step 102, the processor 20 operates the sensor 16 to image the symbol 14 and to store a digital representation of the image in the memory 22. The processor 20 identifies the start/stop characters "Start 93i", "Stop C93" of the symbol 14 to determine the symbol type. The Automatic Identification Manufacturers ("AIM") provide a standardized method by which readers may automatically discriminate between various symbologies.

The processor 20, having imaged the symbol 14, begins sequentially reading the symbol characters 28, for example, from left to right and attempts to decode the symbol characters 28 by converting a given symbol character into its corresponding character value in step 104. The processor 20 attempts to decode all of the symbol characters 28, and employs the error correction characters E1–E6 to detect and correct any damage in the symbol 14. As used generally herein, the term "damage" refers not only to erasures and errors affecting a symbol itself, but also erasures and errors caused from unscanned, undecodable, misdecoded or mislocated symbols or symbol characters. Standard decode and error correction algorithms for Code 93i symbols are known in the art and need not be described herein.

In step 106, if the decode is successful (i.e., all symbol characters 28 are converted to their appropriate character values and no errors are detected), then the processor 20 outputs the decoded data to the user, a device or other desired application as in step 108. If the decode was unsuccessful, then the processor 20 in step 110, selects a group of a number n of successive symbol characters 28 in the symbol 14, thereby making an "educated" guess at the location of the error. The number n is equal to the number of available error correcting characters 30 in the symbol 14. While the method may employ a number less than the number of error correction characters 30 in the symbol 14, such a practice reduce the efficiency of the method. In step 112, the processor 20 attempts to solve the error correction equation with the group of n successive characters treated as erasures. The processor 20 may employ standard Reed-Solomon error correction methods.

In step 114, if the error correction equation is solved, the processor 20 decodes the symbol as in step 116. If, however, the error correction equation is not solved, the processor 20, in step 118, checks a timeout condition. The timeout condition may be an actual running time, a stop time, or a number of iterations or attempts at solving the error correction equation. The timeout condition may correspond to selected characteristics of the processor 20 such that the method is executed during unused processor cycles.

If the timeout condition has been exceeded, then in step 120 the processor 20 declares that multiple symbols have been read, resulting in the decoding error. If the timeout condition is not exceeded, then in step 122 the processor 20 determines if there are more groups of n successive characters in the symbol 14. If there are more groups of n successive characters, the processor 20 returns to step 110, selecting a new group of n successive characters to be treated as erasures. Thus, the processor 20 makes successive "educated" guesses at the location of the error in the symbol 14. The processor 20 thereby avoids using any of the four available error correction characters from E1–E6 to locate the position of the error. All of the error correction characters are then available for correcting the error.

After the processor 20 has unsuccessfully attempted to solve the error correction equation with each group of n successive characters, then the processor 20 begins selecting combinations of n characters, as in step 124. The processor 20 attempts to solve the error correction equation treating the combination of n characters as erasures, as in step 126. If in step 128 the error correction equation is solved, then the processor 20 decodes the symbol 14, as in step 130. However, if the error correction equations are not solved in step 128, then the processor 20 checks a timeout condition in step 132. The timeout condition may be the same as the timeout condition in step 118 or may be a different timeout condition. If the timeout condition is exceeded, then the processor 20 declares multiple symbols in step 134. However, if the timeout condition is not exceeded, the processor 20 determines if more combinations of n characters exist in the symbol 14, as in step 136. If more combinations of n characters exist, the processor 20 selects another combination of n characters in step 124. If, however, no more combinations of n characters exists, the processor 20 declares multiple symbols in step 138.

Thus, the processor 20 is again making successive "educated" guesses at the location of the error to preserve the error correction characters E1–E6 for actually correcting and detecting the errors when located. It may be more efficient to iterate through the groups of successive symbol characters 28 before iterating through the combinations of symbol characters 28 since errors often occur in successive symbol characters 28 (e.g., a torn or smudged symbol). The processor 20 may be programmed to avoid selecting combinations of successive symbol characters 28 so as to not select a previously selected group of symbol characters 28. The method may be simplified by not including error correction characters E1–E6 when selecting groups or combinations although errors in the error correction characters E1–E6 would not be correctable.

The method may be explained with reference to the following example, employing six symbol characters corresponding to the data characters "ABC123" and assuming 3 usable error correction characters E1–E3. The processor 20 attempts to decode the read symbol and determines, for example from the check characters, that an error exists. The processor 20 then selects groups of successive characters to be treated as erasures while attempting to solve the error correction equation. For example, the processor 20 may successively select groups of symbol characters 28 corresponding to the data characters as set out in Table 1, below.

TABLE 1

| ABC |
| BC1 |
| C12 |
| 123 |

If the error correction equation does not solve, then the processor 20 successively selects combinations of symbol characters 28 to treat as erasures while attempting to solve the error correction equation. For example, the processor 20 may successively select groups of symbol characters 28 corresponding to the data characters as set out in Table 2, below.

TABLE 2

| AB1 | BC2 | C13 |
| AB2 | BC3 | C23 |
| AB3 | B12 | |
| AC1 | B13 | |
| AC2 | B23 | |
| AC3 | | |
| A12 | | |
| A13 | | |
| A23 | | |

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to any machine-readable symbology employing error correction, not necessarily the exemplary Code 93i linear barcode generally described above.

These and other changes can be made to the invention in light of the above-detailed description. In general, in the following claims, the terms used should not be construed to limit the invention to the specific embodiments disclosed in the specification and the claims, but should be construed to include all methods of performing error correction and all symbol readers that operate in accordance with the claims. Accordingly, the invention is not limited by the disclosure, but instead its scope is to be determined entirely by the following claims.

We claim:

1. A method of decoding a machine readable barcode symbol comprising a number of characters including a number of error correction characters, each of the characters associated with a respective character code, the method comprising:

reading the machine readable barcode symbol;

selecting a group of successive characters from the machine readable barcode symbol, the number of characters in the selected group being equal to the number of error correction characters in the machine readable barcode symbol;

attempting to solve an error correction equation using the character codes of the characters in the machine readable barcode symbol while identifying each of the characters in the selected group as erasures; and repeating for successive groups of successive characters the selecting a group of successive characters and the attempting to solve an error correction equation using the character codes of the characters in the machine readable barcode symbol while identifying each of the characters in the selected group as erasures until either the error correction equation solves or each group of successive characters has been identified.

2. The method of claim 1, further comprising:

selecting a combination of characters, the number of characters in the selected combination being equal to the number of error correction characters in the machine readable barcode symbol;

attempting to solve the error correction equation using the character codes of the characters in the machine readable barcode symbol while identifying the characters in the selected combination as erasures; and repeating the selecting a combination of characters and the attempting to solve the error correction equation using the character codes of the characters in the machine readable barcode symbol while identifying the characters in the selected combination as erasures for additional combinations of characters until either the error correction equation solves or each combination of characters has been identified.

3. The method of claim 1, further comprising:

selecting a combination of non-successive characters, the number of characters in the selected combination being equal to the number of error correction characters in the machine readable barcode symbol;

attempting to solve the error correction equation using the character codes of the characters in the machine readable barcode symbol while identifying the characters of the selected combination as erasures; and repeating the selecting a combination of non-successive characters and the attempting to solve the error correction equation using the character codes of the characters in the machine readable barcode symbol while identifying the characters of the selected combination as erasures for additional combinations of non-successive characters until either the error correction equation solves or the each combination of non-successive characters has been identified.

4. The method of claim 1, further comprising:

after each group of successive characters has been identified as erasures and each attempt to solve the error correction equation has failed, then:
selecting a combination of non-successive characters, the number of characters in the selected combination being equal to the number of error correction characters in the machine readable barcode symbol;
attempting to solve the error correction equation using the character codes of the characters in the machine readable barcode symbol while identifying the characters of the selected combination as erasures; and
repeating the selecting a combination of non-successive characters and the attempting to solve the error correction equation using the character codes of the characters in the machine readable barcode symbol while identifying the characters of the selected combination as erasures for additional combinations of non-successive characters until either the error correction equation solves or each combination of non-successive characters has been identified.

5. The method of claim 1, wherein each group of successive characters excludes the error correction characters.

6. The method of claim 1, further comprising:

after each group of successive characters has been identified as erasures and each attempt to solve the error correction equation has failed, then:
selecting a combination of non-successive non-error correction characters, the number of characters in the combination being equal to the number of error correction characters in the machine readable barcode symbol;
attempting to solve the error correction equation using the character codes of the characters in the machine readable barcode symbol while identifying the characters of the selected combination as erasures; and
repeating the selecting a combination of non-successive non-error correction characters and the attempting to solve the error correction equation using the character codes of the characters in the machine readable barcode symbol while identifying the characters of the selected combination as erasures for additional combinations of characters until either the equation solves or each combination of non-successive non-error correction characters has been identified.

7. The method of claim 1, further comprising:

monitoring a time out condition; and terminating the decoding when the time out condition is exceeded.

8. The method of claim 1, further comprising:

comparing a number of attempts to solve the error correction equations to a reference value; and terminating the decoding when the number of attempts exceeds the reference value.

9. The method of claim 1, further comprising:

monitoring a time out condition; and determining that there are multiple symbols if the time out condition is exceeded.

10. The method of claim 1, further comprising:

comparing a number of attempts to solve the error correction equations to a reference value; and determining that there are multiple symbols if the number of attempts exceeds the reference value.

11. A method of correcting errors in machine readable symbols comprising a number of characters including a number of error correction characters, at least one of the characters having a corresponding character code, the method comprising:

receiving the character codes for each of the characters in the machine readable symbol; and successively selecting groups of a successive number of characters, the number of characters in each selected group being equal to the number of error correction characters in the machine readable symbol, and successively attempting to solve at least one error correction equation with the character codes of the characters in the machine readable symbol with the characters in each selected group treated as erasures at least until the error correction equation is solved or each group of successive characters has been selected.

12. The method of claim 11, further comprising:

successively selecting combinations of characters, the number of characters in each selected combination being equal to the number of error correction characters in the machine readable symbol, and successively attempting to solve at least one error correction equation with the character codes of the characters in the machine readable symbol with the characters in each selected combination treated as erasures at least until the error correction equation is solved or each combination of characters has been selected.

13. The method of claim 1, further comprising:

successively selecting combinations of non-successive characters, the number of characters in each selected combination being equal to the number of error correction characters in the machine readable symbol, and successively attempting to solve at least one error correction equation with the character codes of the characters in the machine readable symbol with the characters in each selected combination treated as erasures at least until the error correction equation is solved or each combination of characters has been selected.

14. The method of claim 11, further comprising:

successively selecting combinations of non-successive non-error correction characters, the number of characters in each selected combination being equal to the number of error correction characters in the machine readable symbol, and successively atempting to solve at least one an error correction equation with the character codes of the characters in the machine readable symbol with the characters in each selected combination treated as erasures at least until the error correction equation is solved or each combination of characters has been selected.

15. The method of claim 11, further comprising:
successively identifying combinations of non-successive non-error correction characters, the number of characters in each selected combination being equal to the number of error correction characters in the machine readable symbol, and successively attempting to solve at least one error correction equation with the character codes of the characters in the machine readable symbol with the characters in each selected combination treated as erasures after successively selecting groups of a successive number of characters and successively attempting to solve at least one error correction equation with the character codes of the characters in the machine readable symbol with the characters in each selected group treated as erasures.

16. The method of claim 11, further comprising:
monitoring a time out condition; and
terminating the decoding when the time out condition is exceeded.

17. The method of claim 11, further comprising:
comparing a number of attempts to solve the error correction equations to a reference value; and
terminating the decoding when the number of attempts exceeds the reference value.

18. The method of claim 11, further comprising:
monitoring a time out condition; and
determining that there are multiple symbols if the time out condition is exceeded.

19. The method of claim 11, further comprising:
comparing a number of attempts to solve the error correction equations to a reference value; and
determining that there are multiple symbols if the number of attempts exceeds the reference value.

20. A method of decoding a machine readable symbol comprising a number of characters including a number of error correction characters, each of the characters associated with a respective character code, the method comprising:
reading the machine readable symbol;
selecting a combination of characters, the number of characters in the selected combination being equal to the number of error correction characters in the machine readable symbol;
attempting to solve an error correction equation using the character codes of the characters in the machine readable symbol while identifying the characters of the selected combination as erasures; and
repeating the selecting a combination of characters and the attempting to solve an error correction equation using the character codes of the characters of the machine readable symbol while identifying the characters of the selected combination as erasures for additional combinations of characters until either the equation solves or each combination of characters has been identified.

21. The method of claim 20, further comprising:
selecting a group of successive characters from the machine readable symbol, the number of characters in the selected group being equal to the number of error correction characters in the machine readable symbol;
attempting to solve the error correction equation using the character codes of the characters in the machine readable symbol while identifying each of the characters in the selected group of characters as erasures;
repeating for successive groups of successive characters the selecting a group of successive characters and the attempting to solve the error correction equation using the character codes of the characters in the machine readable symbol while identifying each of the characters in the selected group as erasures until either the equation solves or each group of successive characters has been identified.

22. The method of claim 20, wherein selecting a group of successive characters and attempting to solve the error correction equation using the character codes of characters in the machine readable symbol while identifying each of the characters in the selected group as erasures occurs after each combination of characters has been identified.

23. The method of claim 20, wherein selecting a group of successive characters and attempting to solve the error correction equation using the character codes of characters in the machine readable symbol while identifying each of the characters in the selected group as erasures occurs before each combination of characters has been identified.

24. The method of claim 20 wherein the combinations are randomly selected.

25. An apparatus for decoding machine readable symbols comprising a number of characters including a number of error correction characters, each character having a corresponding character code, the apparatus comprising:
an optical sensor positionable to read the machine readable symbol; and
a microprocessor programmed to successively select groups of a number of successive characters from the machine readable symbol, the number of successive characters in each group being equal to the number of error characters in the machine readable symbol, and to successively calculate an error correction equation using the character codes for the characters in the machine readable symbol with the characters in each group identified as erasures.

26. The apparatus of claim 25 wherein the microprocessor programmed is further programmed to successively select combinations of non-successive characters from the machine readable symbol, the number of non-successive characters in each combination being equal to the number of error characters in the machine readable symbol, and to successively calculate an error correction equation using the character codes for the characters in the machine readable symbol with the characters in each combination identified as erasures.

27. A method of correcting errors in machine readable symbols comprising a number of characters including a number of error correction characters, at least one of the characters having a corresponding character code, the method comprising:
receiving the character codes for each of the characters in the machine readable symbol; and
successively selecting groups of at least two successive characters and successively attempting to solve at least one error correction equation with the character codes of the characters in the machine readable symbol with the characters in each selected group treated as erasures at least until the error correction equation is solved or each group of successive characters has been selected.

28. The method of claim 27, further comprising:

successively selecting combinations of at least two characters and successively attempting to solve at least one error correction equation with the character codes of the characters in the machine readable symbol with the characters in each selected combination treated as erasures at least until the error correction equation is solved or each combination of characters has been selected.

* * * * *

UNITED STATES PATENT AND TRADEMARK OFFICE
CERTIFICATE OF CORRECTION

PATENT NO.   : 6,330,972 B1
DATED        : December 18, 2001
INVENTOR(S)  : Christopher A. Wiklof et al.

It is certified that error appears in the above-identified patent and that said Letters Patent is hereby corrected as shown below:

<u>Column 10,</u>
Line 53, "The method of claim 1," should read -- The method of claim 11 -- in the issued patent.

Signed and Sealed this

Third day of September, 2002

Attest:

JAMES E. ROGAN
Attesting Officer               Director of the United States Patent and Trademark Office